(12) United States Patent
Park et al.

(10) Patent No.: US 8,284,334 B2
(45) Date of Patent: Oct. 9, 2012

(54) DISPLAY DEVICE AND METHOD OF FABRICATING THE SAME

(75) Inventors: Su Hyun Park, Gyeonggi-do (KR); Ki Bok Park, Seoul (KR); Jong Hoon Woo, Gyeonggi-do (KR); Young Bok Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 891 days.

(21) Appl. No.: 12/292,953

(22) Filed: Dec. 1, 2008

(65) Prior Publication Data
US 2009/0141225 A1    Jun. 4, 2009

(30) Foreign Application Priority Data

Dec. 3, 2007  (KR) .................. 10-2007-0124555
Dec. 28, 2007 (KR) .................. 10-2007-0140485

(51) Int. Cl.
*G02F 1/1335* (2006.01)
(52) U.S. Cl. ............. 349/15; 349/122; 257/E21.002
(58) Field of Classification Search .......... 349/15, 349/122; 257/E21.002
See application file for complete search history.

(56) References Cited

U.S. PATENT DOCUMENTS

| | | | |
|---|---|---|---|
| 7,626,674 B2 * | 12/2009 | Koyama et al. | 349/153 |
| 2002/0001128 A1 * | 1/2002 | Moseley et al. | 359/465 |
| 2003/0067539 A1 * | 4/2003 | Doerfel et al. | 348/51 |
| 2005/0243253 A1 * | 11/2005 | Imai et al. | 349/122 |
| 2007/0013624 A1 * | 1/2007 | Bourhill | 345/84 |
| 2007/0064102 A1 * | 3/2007 | Tanaka | 348/87 |
| 2008/0165296 A1 * | 7/2008 | Kim et al. | 349/15 |

FOREIGN PATENT DOCUMENTS

| | | | |
|---|---|---|---|
| JP | 2005-202286 | * | 7/2005 |
| JP | WO2007/007543 | | 1/2007 |

\* cited by examiner

*Primary Examiner* — Edward Glick
*Assistant Examiner* — Sang Nguyen
(74) *Attorney, Agent, or Firm* — Morgan, Lewis & Bockius LLP (57) ABSTRACT

Provided are a display device for realizing a multi-view image and a method of fabricating the same. The display device includes: a display panel for displaying an image and a barrier pattern disposed on an outer side of the display panel and for adjusting an optical path in at least two viewing angle directions.

10 Claims, 9 Drawing Sheets

DISPLAY DEVICE AND METHOD OF FABRICATING THE SAME

CROSS-REFERENCE TO RELATED APPLICATIONS

The present application claims priority under 35 U.S.C. 119 and 35 U.S.C. 365 to Korean Patent Application No. 10-2007-0124555 filed on Dec. 3, 2007 and Korean Patent Application No. 10-2007-0140485 filed on Dec. 28, 2007, which are both hereby incorporated by reference in their entirety.

BACKGROUND

1. Field of the Invention

The present disclosure relates to a display device for realizing a multi-view image and a method of fabricating the same.

2. Background of the Invention

An object of a related art display device is to provide the same image to viewers at the same time with a wide viewing angle range. However, if there is only one display device, each individual preference for watching an image is disregarded because different images that respective viewers demand cannot be provided simultaneously.

To resolve the above limitation, provided is a multi-view display device for displaying different images in different directions. The multi-view display device displays respectively different images in at least two directions such that viewers in each direction can watch images they want. For example, if a television is equipped with a multi-view display device, a news program is viewed in the left viewing angle direction, a movie is viewed in the right viewing angle direction, and a drama is viewed in the middle viewing angle direction.

The multi-view display device includes a display panel and a barrier substrate attached on the display panel. The display panel provides at least two images. The barrier substrate controls a path of light to provide a corresponding image in each viewing angle direction.

To fabricate the multi-view display, after fabricating the display panel and the barrier substrate, a process is performed to attach the display panel to the barrier substrate. In a related art manufacturing process, an additional barrier substrate needs to be manufactured, an attaching material is required to attach the display panel to the barrier substrate, and attachment misalignment of the display panel and the barrier substrate occurs. Thus, there are various limitations in increasing a yield of the multi-view display.

Moreover, according to the size and resolution of the display panel, a color filter substrate of the display panel is etched or grinded before attaching the barrier substrate to the display panel, and then the barrier substrate is attached. Therefore, a yield of the multi-view display is decreased due to the damage of the display panel.

SUMMARY

Accordingly, embodiments of the invention are directed to a liquid crystal display device that substantially obviates one or more of the problems due to limitations and disadvantages of the related art.

Embodiments provide a display device for improving a defective multi-view image quality and a method of fabricating the same.

Embodiments also provide a display device capable of reducing a manufacturing cost and improving a manufacturing yield, and a method of fabricating the same.

Embodiments also provide a display device for preventing damage of a display device and applicable to mass production, and a method of fabricating the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

To achieve the technical objects, one embodiment provides a display device. The display device includes a display panel and a barrier pattern. The display panel displays an image. The barrier pattern on the outer side of the display panel adjusts an optical path in at least two viewing angle directions. Additionally, a protection member may be further disposed on the display panel including the barrier pattern.

To achieve the technical objects, another embodiment of the invention provides a method of fabricating a display device. The method includes forming a barrier pattern on the outer side of a first substrate, forming a color filter pattern in the inner side of the first substrate, attaching a thin film transistor to a second substrate having a pixel electrode to face the inner surface of the first substrate, and forming a liquid crystal layer. A protection member may be further formed on the first substrate including the barrier pattern. An align key may be further formed on the outer side of the first substrate.

Hereinafter, preferred embodiments of the invention will be described in detail with reference to the accompanying drawings. Embodiments of the invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout.

Figure 1:
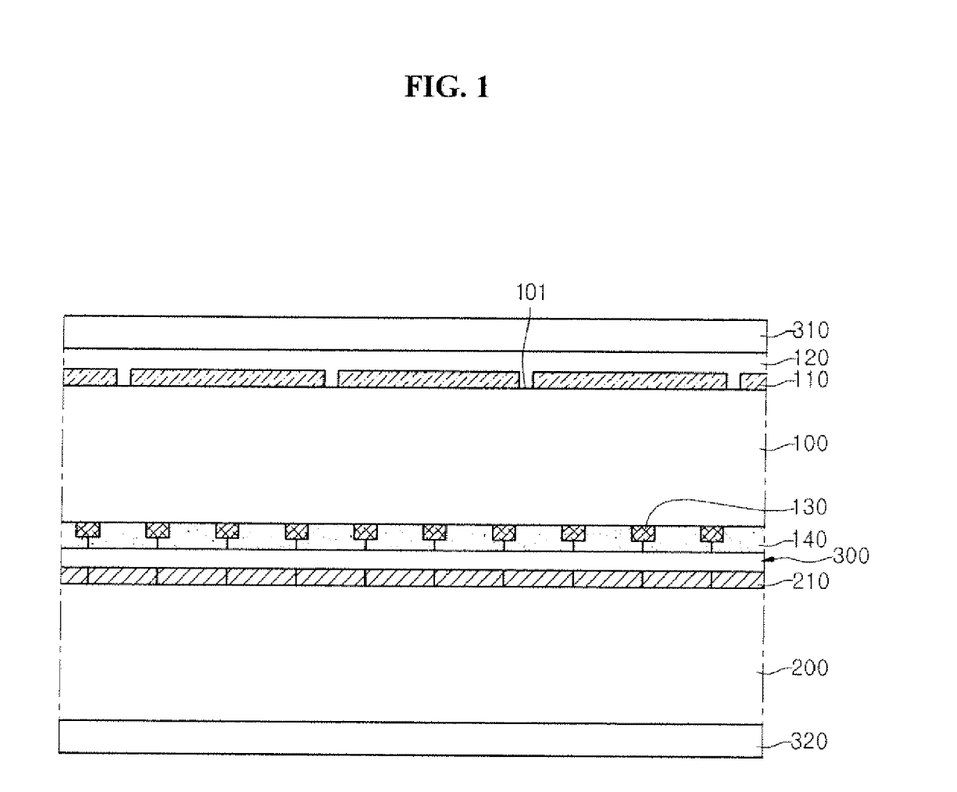
FIG. 1 is a cross-sectional view of the display device according to a first embodiment.
Figure 2:
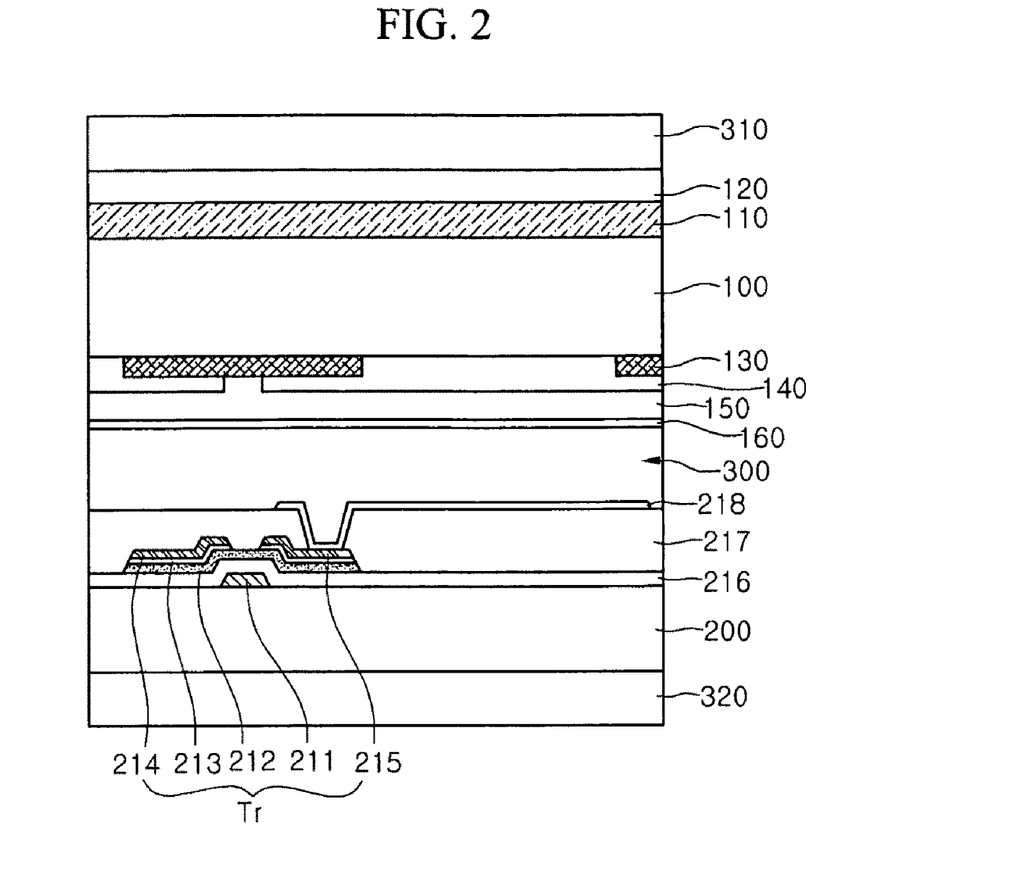
FIG. 2 is an enlarged cross-sectional view illustrating one unit pixel of the display device of FIG. 1.

FIGS. 1 and 2 are views illustrating a display device according to a first embodiment. FIG. 1 is a cross-sectional view of the display device according to the first embodiment. FIG. 2 is an enlarged cross-sectional view illustrating one unit pixel of the display device of FIG. 1.

Referring to FIGS. 1 and 2, the display device includes a display panel for displaying an image and a barrier pattern 110 disposed on the outer side 101 of the display panel. The display panel displays respectively different images in at least two viewing angle directions. The barrier pattern 110 is disposed on a display surface of the display panel for displaying an image, and adjusts an optical path to display an image provided from the display panel in at least two viewing angle directions. Therefore, viewers in each viewing angle direction can watch respectively different images.

In more detail, the display panel includes a plurality of unit pixels. At this point, unit pixels for realizing red, green, and blue colors may constitute a pixel of the minimum unit for displaying an image. The display panel may be a liquid crystal panel including first and second substrates 100 and 200 facing each other and a liquid crystal layer 300 interposed between the first and second substrates 100 and 200. At this point, although not illustrated in the drawings, a backlight unit providing light to the display panel may be further included.

A black matrix pattern 130 having an opening that exposes each unit pixel is disposed in the first substrate 100. That is, the black matrix pattern 130 is disposed on around each unit pixel in order to prevent light leakage. A color filter pattern 140 is disposed on at least the opening to filter light of a specific color. Furthermore, an overcoat layer 150 may be further disposed on an entire surface of the first substrate 100 including the black matrix pattern 130 and the color filter pattern 140. The overcoat layer 150 has a flat top to remove a height difference formed by the black matrix 140 and the color filter pattern 150.

A common electrode 160 formed of a transparent conductive material is disposed on the overcoat layer 150. Moreover, a driving device 210 (e.g., a thin film transistor Tr) and a pixel electrode 218 are disposed in each unit pixel of the inner side of the second substrate 200 facing the first substrate 100.

Although not minutely illustrated in the drawings, the second substrate 200 may be defined by intersecting gate wirings and data wirings. Here, the gate wiring and the data wiring are insulated from each other through a gate insulation layer 216 interposed therebetween.

The thin film transistor Tr, electrically connected to the gate wiring and the data wiring, is disposed in each unit pixel. The thin film transistor Tr may include a gate electrode 211, semiconductor patterns 212 and 213, a gate insulation layer 216, a source electrode 214, and a drain electrode 215. A passivation layer 217 is disposed on the second substrate 200 including the thin film transistor Tr. The passivation layer 217 may be formed of an insulating material.

A pixel electrode 218, electrically connected to the thin film transistor Tr (i.e., the drain electrode 215), is disposed on the passivation layer 217. The pixel electrode 218 may be formed of a light transmitting conductive material. For example, the pixel electrode 218 may be formed of indium tin oxide (ITO) or indium-zinc oxide (IZO), which transmits light.

The liquid crystal layer 300 is interposed between a common electrode 160 and the pixel electrode 218. The liquid crystal layer 300 is driven through an electric field formed in the common electrode 160 and the pixel electrode 218. Thus, an image can be provided by adjusting transmissivity of light provided from a backlight unit.

Since the barrier pattern 110 is disposed on the display surface of the display panel, it may be disposed on the outer side of the first substrate 100 through which light is transmitted. That is, the barrier pattern 110 may have an opening that partially exposes the first substrate 100. The opening may have a stripe form. While looking at the opening from each viewing angle direction, respectively different pixels can be viewed. Thus, viewers in each viewing angle direction can watch respectively different images. The barrier pattern 110 may be formed of a light blocking material (e.g., Cr or a black resin) for blocking light.

The multi-view image is affected based on an actual display surface for displaying the image (i.e., a gap between the bottom of the color filter pattern 140 and the barrier pattern 110). Since the barrier pattern 110 is disposed on the first substrate 100, the gap is the thickness of the first substrate 100. Because the flat first substrate 100 is disposed between the barrier pattern 110 and the display surface, the gap can be uniformly maintained. Therefore, although a related art display device has difficulties to obtain a uniform gap because an adhesive material is interposed between the display surface and the barrier pattern 110, the display device of the present disclosure can provide a multi-view image of a more uniform quality than before because the first substrate 100 is interposed between the barrier pattern 110 and the display surface.

For example, when the display panel is a 32" model where a pitch of the pixel (i.e., unit pixels for realizing red, green, and blue colors) is about 350 μm, the gap may range from 500 μm to 700 μm in order to realize a multi-view. Therefore, the thickness of the first substrate 100 may range from 500 μm to 700 μm. Accordingly, since the thickness of the first substrate 100 mainly used for manufacturing processes ranges from 500 μm to 700 μm, it is unnecessary to additionally grind or etch the surface of the first substrate 100 in order to realize a multi-view. That is, if the display panel is a big size model, a multi-view can be realized through a photo process for forming the barrier pattern 110 on the first substrate 100, without additionally processes.

A protection member 120 may be further disposed on the first substrate 100 including the barrier pattern 110. The protection member 120 may be formed of a material for protecting the barrier pattern 110. For example, the protection member 120 may be formed of one of acrylic resin, imide resin, oxide silicon, nitride silicon, and ITO. However, a material for the protection member 120 is not limited to the above materials.

Polarizing members 310 and 320 having orthogonally polarized axes may be further respectively disposed on the outer side of the first substrate 100 including the barrier pattern 110 and the outer side of the second substrate 100.

In the description of the embodiment, the display panel is described as a liquid crystal panel of a twisted nematic (TN)

mode, but is not limited thereto. The display panel may be another mode. For example, the display panel may be a liquid crystal panel of a vertical alignment (VA) mode, an in-plan switching (IPS) mode, or a fringe field switching (FFS) mode.

Accordingly, since the barrier pattern 110 is disposed on the outer side of the display panel for displaying an image, a uniform multi-view image can be provided.

Figure 3:
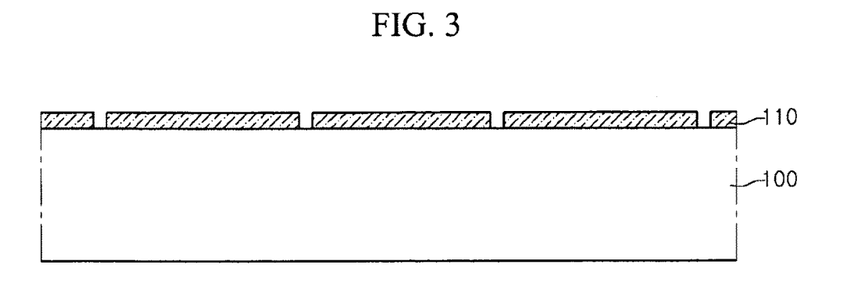
FIGS. 3 through 7 are cross-sectional views illustrating a method of fabricating a display device according to a second embodiment.

FIGS. 3 through 7 are cross-sectional views illustrating a method of fabricating a display device according to a second embodiment. Referring to FIG. 3, a first substrate 100 is provided first to manufacture a display device. The first substrate 100 may be formed of a transparent material. For example, the first substrate 100 may be a glass substrate or a plastic substrate. Since the first substrate 100 may correspond to a gap between a barrier pattern 110 and a color filter 140, which will be described later, the thickness of the first substrate 100 may range from 500 μm to 700 μm if a display device to be manufactured is a 32" model and a pitch of its pixel is about 350 μm.

The barrier pattern 110 is formed on the outer side of the first substrate 100. To form the barrier pattern 110, a light blocking layer is formed by depositing a light blocking material (e.g., Cr) on the first substrate 100. A photoresist layer is formed on the light blocking layer. The photoresist layer may be formed by coating a photosensitive material on the light blocking layer. A photoresist pattern having a predetermined pattern is formed on the photoresist layer through exposure and developing processes using a mask. As the light blocking layer is etched using the photoresist pattern as an etching mask, the barrier pattern 110 having an opening that expose the first substrate 100 may be formed. For example, the opening may have a stripe form.

Here, if the light blocking material is formed of a photosensitive material, the barrier pattern 110 may be through coating, exposure, and developing processes on the photosensitive material.

Furthermore, although not illustrated in the drawings, an align key may be further formed on the edge of the first substrate 100. The align key may be formed during a process of forming the barrier pattern 110. Therefore, the align key may be formed of the same material as the barrier pattern 110.

Figure 4:
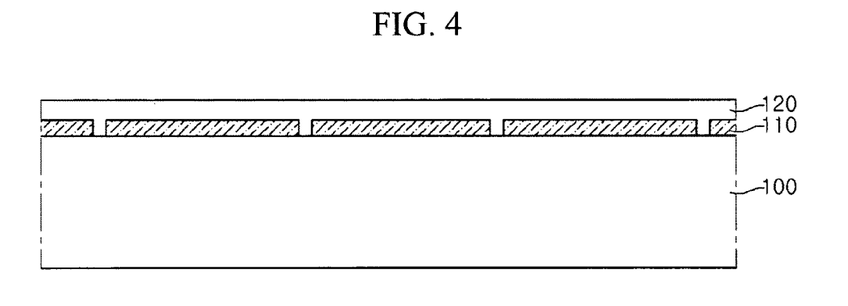

Referring to FIG. 4, a protection member 120 is formed on the outer side of the first substrate 100 including the barrier pattern 110. The protection member 120 prevents scratch or damage of the barrier pattern 110 during a next process.

The protection member 120 may be formed through a deposition process or a coating process, based on a material. For example, if the protection member 120 may be formed of one of ITO, nitride silicon, and oxide silicon, it may be formed through a deposition process. Additionally, if the protection member 120 is formed of an organic material such as acrylic resin and imide resin, it may be formed through a coating process. The coating process includes a slit coating method, a spray coating method, and an inkjet printing method.

Figure 5:
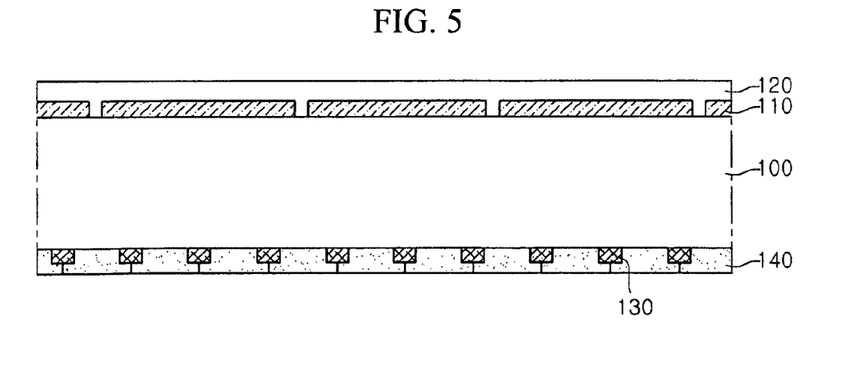

Referring to FIG. 5, a block matrix pattern 130 having an opening that exposes each unit pixel is formed on the inner side of the first substrate 100 (i.e., an areas where no barrier pattern 110 is formed). After forming a block resin layer on the first substrate 100, the block resin is exposed and developed to form the black matrix pattern 130. Unlike this, if the black matrix pattern 130 may be formed of an inorganic material such as chrome, it is obtained through an etching process using a photoresist.

At this point, an exposure process of the block resin layer is performed by aligning a mask by using the align key disposed on the outer side of the first substrate 100.

A color filter pattern 140 is formed at least on the opening. To form the color filter pattern 140, a color filter resin layer is formed on the first substrate 100 including the block matrix pattern 130, and then exposure and developing processes are performed thereon. Both ends of each color filter pattern 140 may be formed to overlap the black matrix pattern 130.

At this point, an exposure process of the color filter resin layer may be performed by a mask aligned through the align key disposed on the outer side of the first substrate 100. Furthermore, although not illustrated in the drawings, an overcoat layer may be formed on the first substrate 100 including the black matrix pattern 130. Here, if the display device includes a TN mode liquid crystal panel, a common electrode may be further formed on the overcoat layer.

Accordingly, after forming the barrier pattern 110 on the outer side of the first substrate 100 of the display panel, a defective multi-view quality due to misalignment between the related art display panel and the barrier substrate 110 can be prevented because the color filter pattern 140 is formed on the inner side of the first substrate 100.

Figure 6:
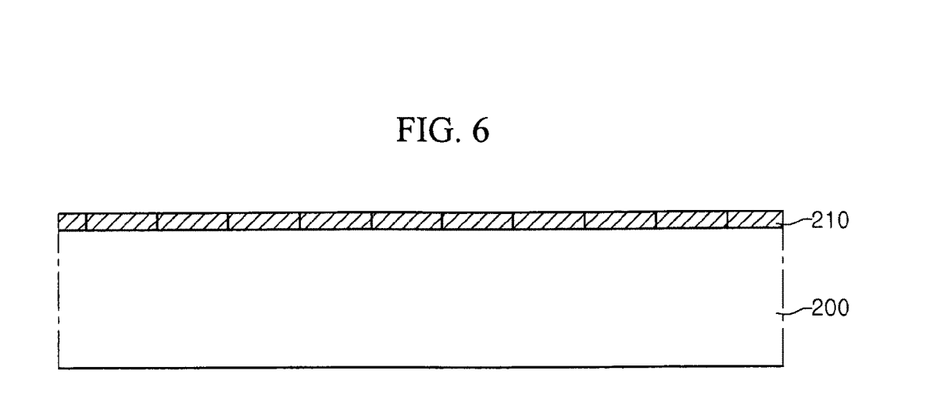

Referring to FIG. 6, a second substrate 200 including a driving device 210 disposed for each unit pixel is provided in addition to the first substrate 100. The driving device 210 may include a thin film transistor and a pixel electrode that is electrically connected to the thin film transistors. Furthermore, a gate wring and a data wiring, which are electrically connected to the thin film transistor and define each unit pixel through intersections of the gate wiring and the data wiring, may be further disposed on the second substrate 200.

Figure 7:
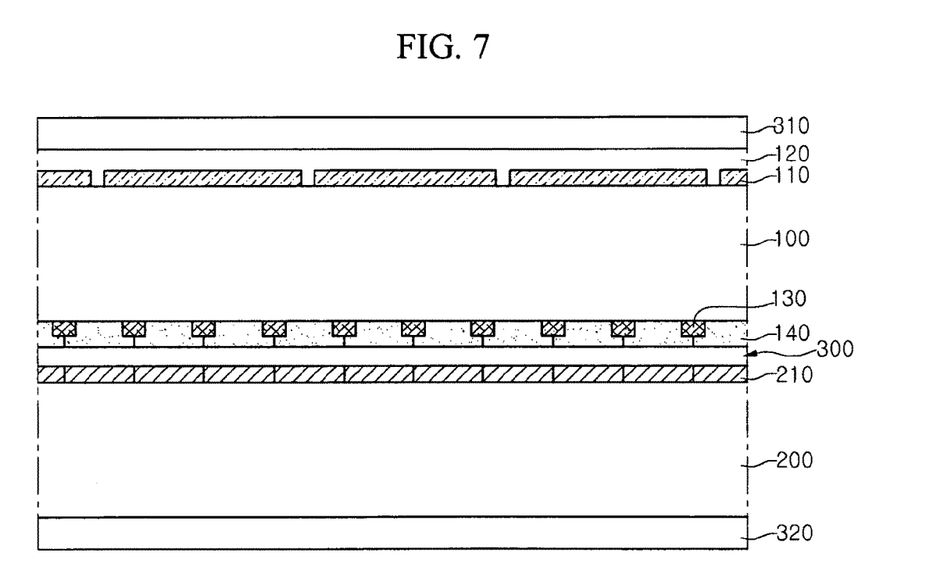

Referring to FIG. 7, a seal pattern (not shown) is formed on the inner side of one of the first and second substrates 100 and 200. Additionally, liquid crystal is dropped into the inner side of one of the first and second substrates 100 and 200 to form a liquid crystal layer 300. Next, by using the seal pattern, the first and second substrates 100 and 200 are attached to each other.

The forming of the liquid crystal layer 300 includes a liquid crystal dropping method in the embodiment, but is not limited thereto. For example, the liquid crystal layer may be formed through a liquid crystal injecting method.

Here, the first and second substrate 100 and 200 may be a motherboard including a plurality of cells. At this point, after performing an attachment process, a scribing process may be performed to separate the attached first and second substrates 100 and 200 into a plurality of cell units. Next, polarizing members 310 and 320 having respectively orthogonally polarized axes may be respectively attached to the outer side of the first substrate 100 and the outer side of the second substrate 200, which include the plurality of cell units. Then, a module process is performed to form a display device.

Accordingly, since the barrier pattern 110 is formed on at least one outer side of the display panel through a photo process in the embodiment, a defective multi-view quality due to misalignment of the related art display panel and barrier substrate can be prevented.

Moreover, as the barrier pattern 110 is formed on the outer side of the first substrate 100, damage of the display panel occurring during an attachment process of the related art display panel and barrier substrate can be prevented. Additionally, since the attachment process of the related art display panel and barrier substrate is omitted, a manufacturing yield can be improved.

Furthermore, as the barrier pattern 110 is formed on the outer side of the first substrate 100, an additional substrate and adhesive member are not required. Therefore, manufacturing cost can be reduced.

Moreover, compare to a related art method in which a barrier substrate is attached after forming a cell, a cell can be manufactured after forming the barrier pattern 110 on the motherboard and then a display device. Therefore, mass production becomes possible.

Figure 8:
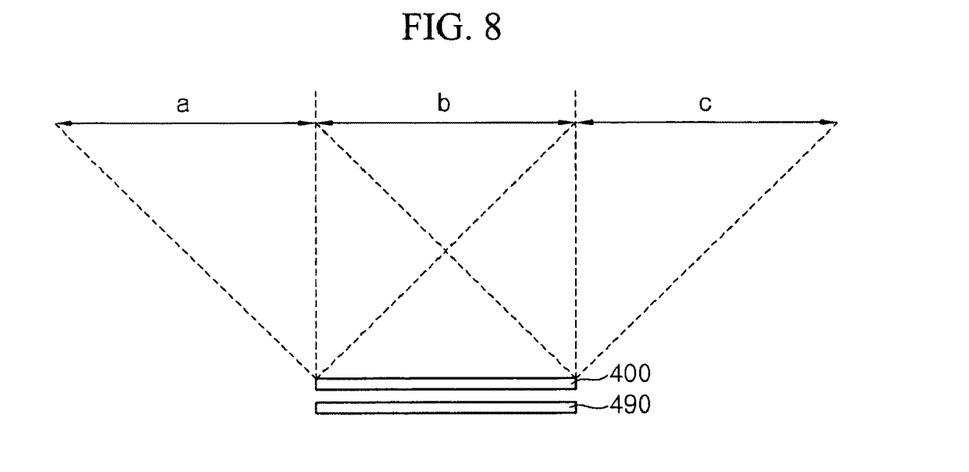
FIG. 8 is a view illustrating an image area displayed based on a viewing angle direction of a display device according to a third embodiment.
Figure 9:
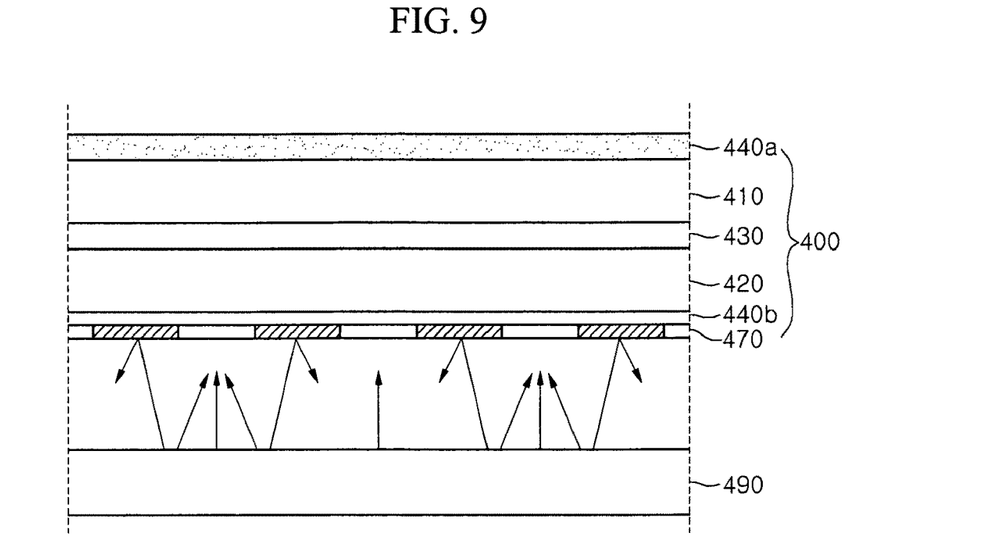
FIG. 9 is a cross-sectional view of the display device for a multi-viewing angle according to the third embodiment.

FIG. 8 is a view illustrating an image area displayed based on a viewing angle direction of a display device according to a third embodiment. FIG. 9 is a cross-sectional view of the display device for a multi-viewing angle according to the third embodiment.

As illustrated in FIGS. 8 and 9, the display device according to the third embodiment includes a display panel 400 and a backlight unit 490 disposed on the rear of the display panel 400 to provide light.

The display device displays respectively different images in at least two regions a, b, and, c according to a visual angle of a user. For this, the display panel 400 includes a barrier film 470 for controlling transmitted light. Since the barrier film 470 is disposed on the display surface of the display panel 400, That is, the barrier film 470 may have an opening that partially exposes the display panel 400. The opening may have a stripe form. While looking at the opening from each viewing angle direction, respectively different pixels can be viewed. Thus, viewers of the regions a, b, and c in each viewing angle direction can watch respectively different images.

The display panel 400 includes a thin film transistor substrate 420, a color filter substrate 410 corresponding to the thin film transistor substrate 420, and a liquid crystal layer 430 interposed the substrates 420 and 410.

Although not minutely illustrated in the drawings, a thin film transistor substrate 420 includes respectively intersecting gate lines and data lines and a thin film transistor (or, referred to as TFT) on intersections of the gate lines and the data lines.

Additionally, a color filter substrate 410 includes a color filter for displaying color in each pixel defined by the gate line and the data line and a black matrix disposed on a region corresponding to the gate line and the data line.

A first polarizing film 440a is attached to the top of the color filter substrate 410 and a second polarizing film 440b is attached to the bottom of the thin film transistor 420.

A barrier film 470 is disposed on the bottom of the second polarizing film 440.

The barrier film 470 is attached to the bottom of the second polarizing film 440b through a lamination method.

Figure 10:
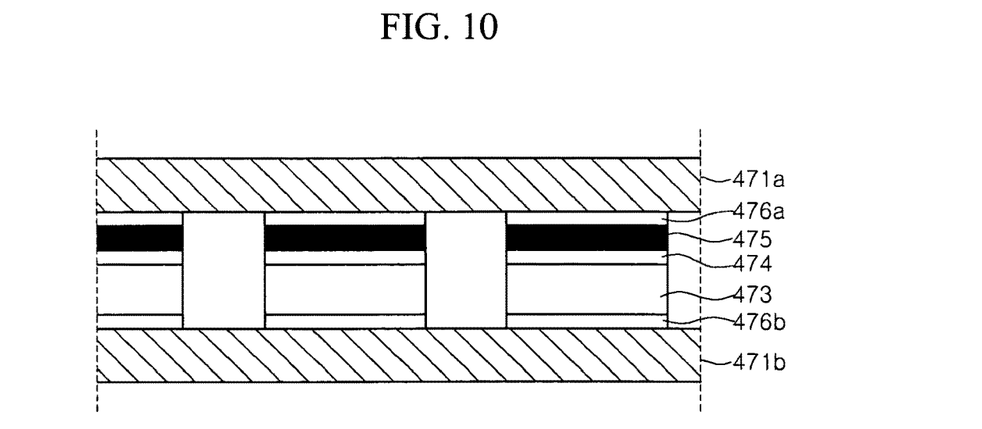
FIG. 10 is a cross-sectional view illustrating a structure of the barrier film of FIG. 9.

FIG. 10 is a cross-sectional view illustrating a structure of the barrier film of FIG. 9.

As illustrated in FIG. 10, the barrier film 470 of FIG. 9 according to the third embodiment includes a base film 473, a reflective layer 474 on the base film 473, a barrier layer 475 disposed on the reflective layer 474, a first adhesive layer 476a on the barrier layer 475, and a first release agent film 471a disposed on the first adhesive layer 476a.

The barrier film 470 of FIG. 9 further includes a second adhesive layer 476b disposed on the rear of the base film 473 and a second release agent film 471b disposed on the bottom of the second adhesive layer 476b.

Here, components except for the first and second release agent films 471a and 471b are patterned through a die cutting process as shown in FIG. 10.

The barrier film 470 of FIG. 9 according to the embodiment has a structure where the base film 473, and the first and second adhesive layers 476a and 476b are patterned, but is not limited thereto. That is, excepting for the barrier layer 475 and the reflective layer 474, the base film 473 and first and second adhesive layers 476a and 476b may be selectively patterned.

The base film 473 is formed of a transparent material.

The reflective layer 474 on the base film 473 may be formed of Al, AlNd, Ag compound, Cr, Cu, mo, Ti, and white ink.

By reflecting light progressing toward the barrier layer 475 among light incident to the reflective layer 474, light loss due to the barrier layer 475 can be prevented.

That is, since the reflective layer 474 reflects light to achieve a recycling effect, light loss due to the barrier layer 475 can be minimized and also brightness of the display device can be improved.

The barrier layer 475 is formed of a material for blocking light. For this, block ink may be printed with a thickness of several μm.

In relation to the attachment method of the barrier film 470 and the display panel 400 of FIG. 9 according to the third embodiment, the first release agent film 471a of the barrier film 470 is removed first and is attached to the bottom of the display panel 400 of FIG. 9. Once attachment is completed, the second release-agent film 471b is removed.

Table 1 shows simulation data of the present disclosure. A brightness difference according to a material of the reflective layer 474, while compared to a related art barrier substrate, is shown.

TABLE 1

|  | Barrier substrate | Barrier film (Cr) | Barrier film (AlNd) |
| --- | --- | --- | --- |
| Brightness | 116.5nit | 143nit | 174.8nit |

Referring to Table 1, if the barrier film 470 of FIG. 9 includes the reflective layer 474 formed of Cr, brightness is improved by about 23% compared to a related art barrier substrate. Additionally, if the barrier film 470 of FIG. 9 includes the reflective layer 474 formed of AlNd, brightness is improved by about 50% compared to a related art barrier substrate.

Accordingly, the barrier film of the present disclosure improves brightness, compared to a display device having a related art barrier substrate.

As described above, since the display device attaches the barrier film 470 of a film type to the display panel 400, the number of manufacturing processes can be drastically reduced if considering a photolithography process for forming a barrier pattern on a related art glass substrate and an attachment process for attaching a barrier substrate to a display panel.

Additionally, since the barrier film 470 of FIG. 9 has a thin film type, it is more advantageous to miniaturization compared to a related art display device where a barrier is patterned on a glass substrate.

Additionally, according to the simulation result, the barrier film 470 of FIG. 9 including the reflective layer 474 can more improves the brightness of the display device compared to the related art barrier substrate 470 of FIG. 9.

Figure 11:
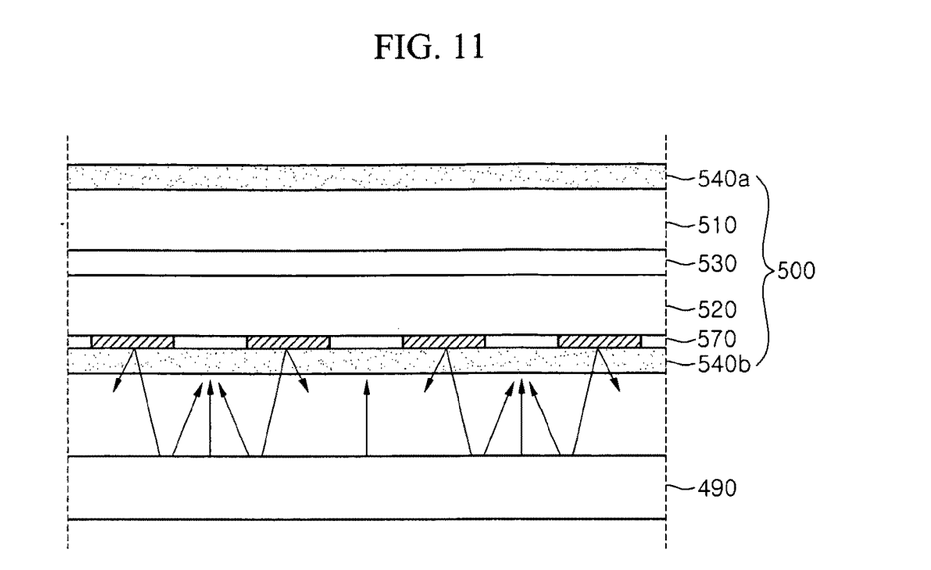
FIG. 11 is a cross-sectional view illustrating a di play device for a multi-viewing angle according to a fourth embodiment.
Figure 12:
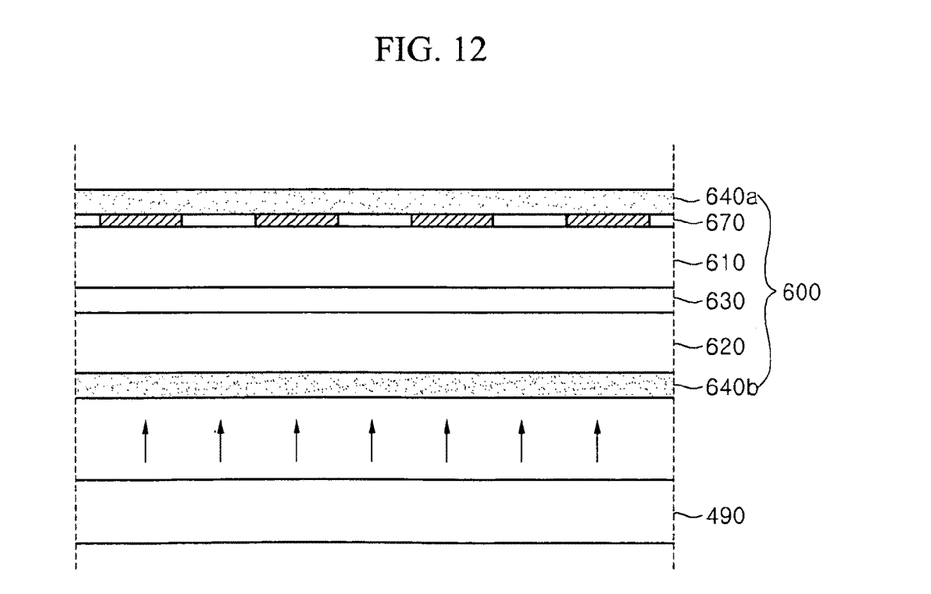
FIGS. 12 and 13 are cross-sectional views illustrating a display device for a multi-viewing angle according to a fifth embodiment.
Figure 13:
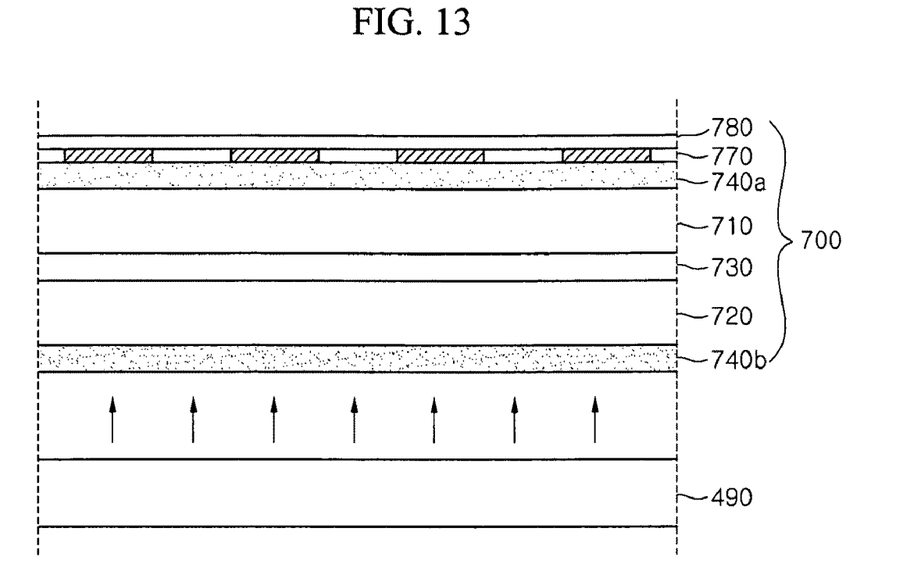

FIG. 11 is a cross-sectional view illustrating a display device for a multi-viewing angle according to a fourth embodiment. FIG. 12 is a cross-sectional view illustrating a display device for a multi-viewing angle according to a fifth embodiment. FIG. 13 is a cross-sectional view illustrating a display device for a multi-viewing angle according to a fifth embodiment.

As illustrated in FIG. 11, according to a display panel 500 of the fourth embodiment, a liquid crystal layer 530 is interposed between a thin film transistor substrate 520 and a color filter substrate 510, and a first polarizing film 540a is disposed on the color filter substrate 510. A barrier film 570 is attached to the bottom of the thin film transistor substrate 520 and a second polarizing film 540*b* is disposed on the bottom of the barrier film 570. Overlapping description for the barrier film 570 will be omitted.

As illustrated in FIG. 12, according to a display panel 600 of the fifth embodiment, a liquid crystal layer 630 is interposed between a thin film transistor substrate 620 and a color filter substrate 610 and a second polarizing film 640*b* is disposed on the bottom of the thin film transistor substrate 620. A barrier film 670 is attached to the top of the color filter substrate 610, and a first polarizing film 640*a* is disposed on the barrier film 670.

As illustrated in FIG. 13, according to the display panel 700 of the sixth embodiment, a liquid crystal layer 730 is interposed between a thin film transistor substrate 720 and a color filter substrate 710. A first polarizing film 740*a* is disposed on the top of the color filter substrate 710 and a second polarizing film 740*b* is disposed on the bottom of the thin film transistor substrate 720. A barrier film 770 is attached to the top of the first polarizing film 740*a* and a protective film 780 is disposed on the barrier film 770 to protect it.

Figure 14:
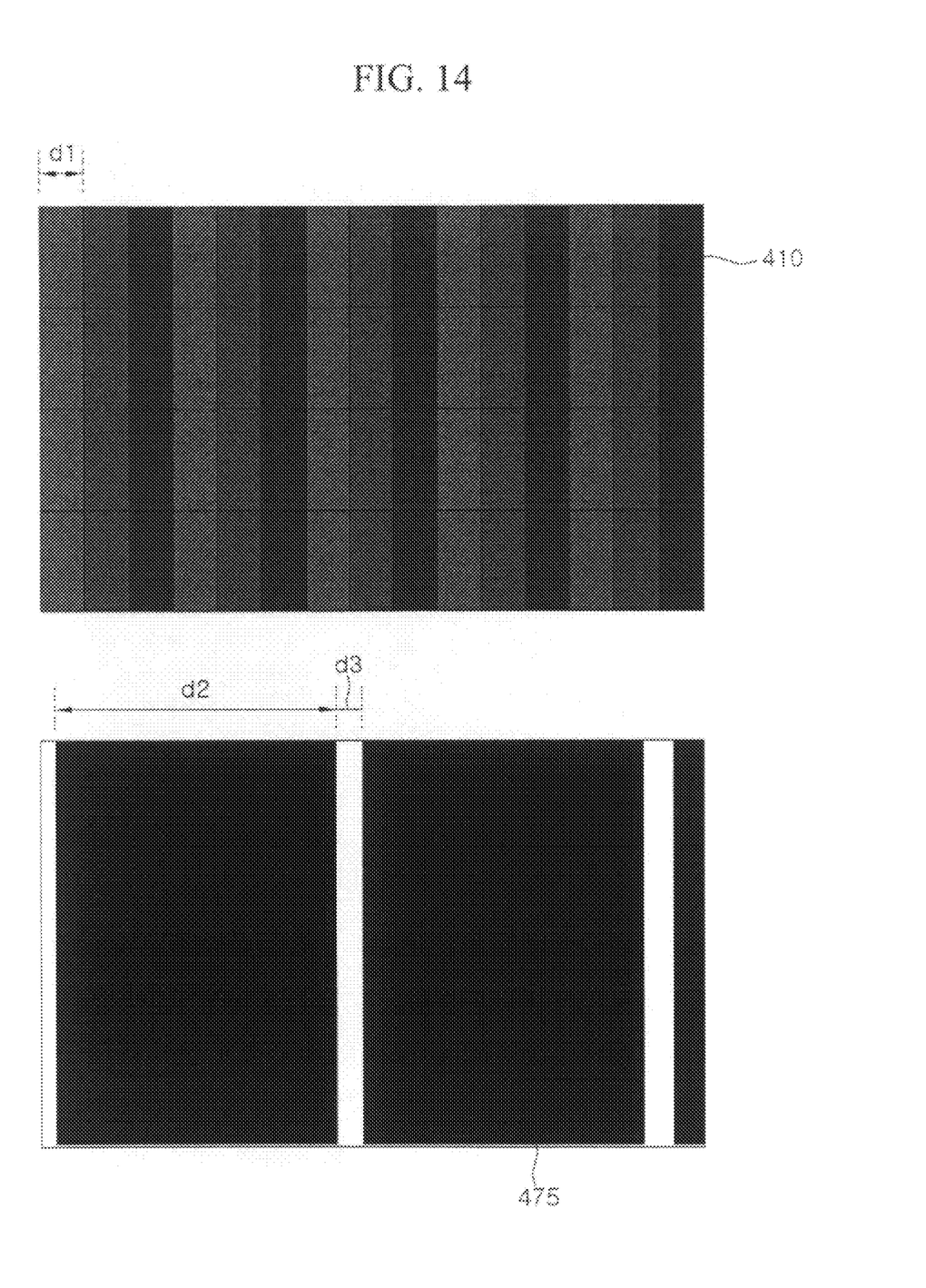
FIG. 14 is a plan view illustrating a color filter sL bstrate and a barrier film of a liquid crystal display device.

FIG. 14 is a plan view illustrating a color filter substrate and a barrier film of a liquid crystal display device. In FIG. 14, the color filter substrate 410 and the barrier film of the liquid crystal display device are shown. A ratio of the width d1 of a pixel of the color filter substrate 410 to the width d2 of the barrier layer 475 is 1:7 to 1:10. A ratio of the width d2 of the barrier layer 475 to the slit width d3 between the barrier layers 475 is 10:1 to 3:1. The liquid crystal display device of the above structure has an aperture ratio of 5% to 25%.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a first substrate including a color filter;
   a second substrate facing the first substrate and including a driving device;
   a liquid crystal interposed between the first and second substrates; and
   a barrier film attached to one of the first and second substrates,
   wherein the barrier film comprises a base film, a reflective pattern disposed on the base film, a barrier pattern disposed on the reflective pattern, a first adhesive layer disposed on the reflective pattern, a second adhesive layer disposed on a rear of the base film and first and second release agent films attached to the first and second adhesive layers.

2. The display device according to claim 1, wherein the base film and the first and second adhesive layers have the same pattern as the reflective pattern and the barrier pattern.

3. The display device according to claim 1, wherein the reflective pattern is formed by a material selected from the group consisting of Al, AlNd, Ag compound, Cr, Cu, mo, Ti, and white ink.

4. The display device according to claim 1, wherein a ratio of the width of the barrier pattern to the width of a subpixel is 7:1 to 10:1.

5. The display device according to claim 1, wherein a ratio of the width of the barrier pattern to the slit width between the barrier patterns is 10:1 to 3:1.

6. The display device according to claim 1, wherein barrier film is attached to the first and second substrates through a lamination method.

7. The display device according to claim 1, wherein a protection film is disposed on the barrier film.

8. The display device according to claim 1, wherein an aperture ratio of the display device is 5% to 25%.

9. The display device according to claim 1, wherein a polarizing film is disposed on the barrier film on the first substrate.

10. The display device according to claim 1, wherein a polarizing film is disposed on the barrier film on the second substrate.

* * * * *